United States Patent
Hara et al.

(10) Patent No.: US 7,999,449 B2
(45) Date of Patent: Aug. 16, 2011

(54) ELECTROCONDUCTIVE POLYMER ELECTRODE AND ACTUATOR USING THE SAME

(75) Inventors: Susumu Hara, Suita (JP); Tetsuji Zama, Suita (JP)

(73) Assignee: EAMEX Corporation, Osaka (JP)

( * ) Notice: Subject to any disclaimer, the term of this patent is extended or adjusted under 35 U.S.C. 154(b) by 12 days.

(21) Appl. No.: 11/571,349

(22) PCT Filed: Mar. 24, 2005

(86) PCT No.: PCT/JP2005/005361
§ 371 (c)(1),
(2), (4) Date: Jan. 8, 2007

(87) PCT Pub. No.: WO2006/001106
PCT Pub. Date: Jan. 5, 2006

(65) Prior Publication Data
US 2007/0254216 A1    Nov. 1, 2007

(30) Foreign Application Priority Data
Jun. 29, 2004 (JP) .................................. 2004-191839

(51) Int. Cl.
*H01M 4/02* (2006.01)
(52) U.S. Cl. .......................... 310/363; 310/338; 429/339
(58) Field of Classification Search .................. 310/366, 310/363; 429/339
See application file for complete search history.

(56) References Cited

U.S. PATENT DOCUMENTS

| | | | | |
|---|---|---|---|---|
| 5,152,271 A * | 10/1992 | Matsumura | .................... | 123/504 |
| 5,986,046 A * | 11/1999 | Nishiyama et al. | ............ | 528/423 |
| 6,249,076 B1 * | 6/2001 | Madden et al. | ................ | 310/363 |
| 6,280,854 B1 * | 8/2001 | Tasaka et al. | .................. | 428/500 |
| 6,413,282 B1 * | 7/2002 | Tanahashi et al. | ............. | 29/25.03 |
| 6,462,936 B1 * | 10/2002 | Fujimoto et al. | ............... | 361/525 |
| 6,543,110 B1 * | 4/2003 | Pelrine et al. | ................. | 29/25.35 |
| 6,583,533 B2 * | 6/2003 | Pelrine et al. | .................. | 310/309 |
| 2002/0139688 A1 * | 10/2002 | Okura et al. | ................... | 205/333 |
| 2004/0072067 A1 * | 4/2004 | Minami et al. | ................. | 429/212 |
| 2006/0076540 A1 * | 4/2006 | Zama et al. | .................... | 252/500 |

FOREIGN PATENT DOCUMENTS

| | | |
|---|---|---|
| JP | 1-132046 | 5/1989 |
| JP | 5-290831 | 11/1993 |
| JP | 8-298137 | 11/1996 |
| JP | 11-93827 | 4/1999 |
| JP | 2000-83389 A | 3/2000 |
| JP | 2000-123825 A | 4/2000 |
| JP | 2000-133854 A | 5/2000 |
| JP | 2003-170400 A | 6/2003 |
| JP | 2004-162035 A | 6/2004 |
| JP | 2005-330457 A | 12/2005 |
| WO | WO 00/50771 | 8/2000 |
| WO | WO 2005/026230 A1 | 3/2005 |

* cited by examiner

Primary Examiner — Thomas M Dougherty
Assistant Examiner — Bryan P Gordon
(74) Attorney, Agent, or Firm — Knobbe, Martens, Olson & Bear, LLP

(57) ABSTRACT

The present invention relates to an electrode, wherein a substrate comprises a porous carbon material and an electroconductive polymer layer formed by an electrolytic polymerization method is provided substantially on the substrate; the electrode, wherein the porous carbon material comprises at least one porous carbon material selected from the group consisting of a carbon paper, a carbon fiber, a porous carbon sheet and an activated carbon sheet; and an actuator having the above electrode as a counter electrode.

9 Claims, 1 Drawing Sheet

ELECTROCONDUCTIVE POLYMER ELECTRODE AND ACTUATOR USING THE SAME

This application is the U.S. National Phase under 35 U.S.C. §371 of International Application PCT/JP2005/005361, filed Mar. 24, 2005, which claims priority to Japanese Patent Application No. 2004-191839, filed Jun. 29, 2004. The International Application was not published under PCT Article 21(2) in English.

TECHNICAL FIELD

The present invention relates to an electrode containing an electroconductive polymer and to an actuator using the electrode.

BACKGROUND ART

An actuator that generates electrochemical extension/contraction or warping is provided with a pair of electrodes and, by applying a voltage to the respective electrodes, migration of electric charge or the like occurs, whereby driving of extension/contraction or warping can be carried out (See, for example, Patent Document 1)).

For example, suppose that one of the aforementioned pair of electrodes is allowed to be an extensible and contractible working electrode containing an electroconductive polymer as a principal material, and the other one is allowed to be an opposing electrode made of a platinum electrode. When a positive electric potential is applied to the aforementioned working electrode, the electroconductive polymer captures anions and the aforementioned working electrode extends, and when a reverse electric potential is applied to the aforementioned working electrode, the aforementioned working electrode contracts, whereby the aforementioned actuator undergoes extension/contraction driving.

Patent Document: Japanese Patent Application Laid-Open (JP-A) No. 2004-162035

DISCLOSURE OF THE INVENTION

Problems to be Solved by the Invention

In an actuator using an opposing platinum electrode as described above, a large negative electric potential is often applied to the opposing electrode to generate hydrogen in allowing the actuator to extend or contract by applying an electric potential to the actuator serving as the working electrode. Also, in order to assemble a compact actuator cell, a small and thin opposing electrode must be used; however, when the opposing electrode becomes small, the efficiency of electrochemical reaction decreases, leading to decrease in the actuator performance. Also, when an electrode using a base metal is used as the opposing electrode in order to restrain the generation of hydrogen, the opposing electrode is corroded, and the actuator performance decreases because of the eluted metal ions.

An object of the present invention is to provide an opposing electrode that does not generate hydrogen when a large voltage is applied in an actuator using a working electrode containing an electroconductive polymer. Further, it is to provide an opposing electrode that does not decrease the efficiency of electrochemical reaction in an actuator even if the opposing electrode is made smaller. Also, it is to provide an actuator using an electroconductive polymer in a driving part that can achieve scale reduction without generation of hydrogen from the opposing electrode and without decreasing the extension and contraction performance.

Means for Solving the Problems

The present invention is an electrode wherein a substrate contains a porous carbon material, and an electroconductive polymer layer formed by an electrolytic polymerization method is provided substantially on the substrate. Also, the present invention is an actuator comprising a pair of electrodes and an electrolyte, wherein a working electrode is an extensible and contractible electrode containing an electroconductive polymer, and an opposing electrode is an electrode wherein an electroconductive polymer layer formed by an electrolytic polymerization method is provided substantially on a substrate.

Effects of the Invention

When the electrode of the present invention is used as an opposing electrode, hydrogen is not generated from the opposing electrode even if a negative electric potential is applied, and the reaction efficiency does not decrease even if the size of the opposing electrode is reduced. For this reason, in the electrode of the present invention, a voltage higher than in the conventional one can be applied to the working electrode, and also the size can be reduced, so that a small actuator that can largely extend and contract can be obtained.

DESCRIPTION OF THE REFERENCE NUMERALS

Figure 1:
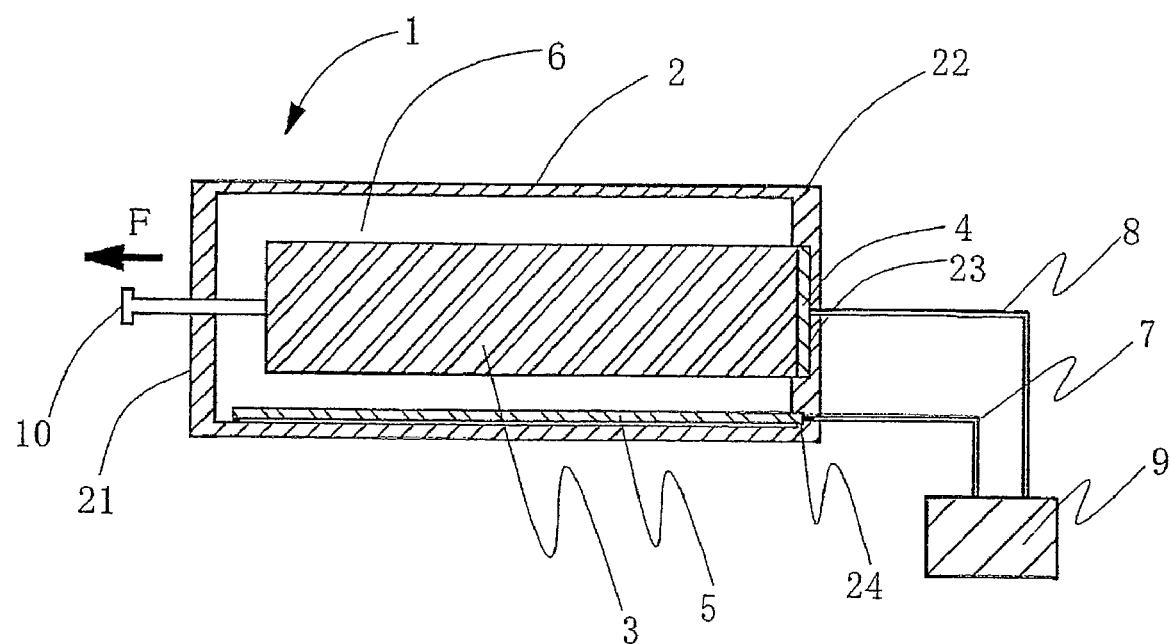
FIG. 1 is a cross-sectional view of an actuator using an electrode, wherein an electroconductive polymer layer formed by the electrolytic polymerization method is provided substantially on a porous carbon material.

1 Actuator
2 Box body
21 tip end part
22 bottom part
23 recessed part
24 opposing-electrode-fitting recessed part
3 working electrode
4 connection plate
5 opposing electrode
6 electrolyte
7 lead
8 lead
9 power source
10 shaft

BEST MODES FOR CARRYING OUT THE INVENTION

The present invention is an electrode wherein a substrate contains a porous carbon material, and an electroconductive polymer layer formed by an electrolytic polymerization method is provided substantially on the substrate. In the aforementioned electrode, an electroconductive polymer layer is formed substantially on a porous carbon material, so that the electroconductive polymer has a larger specific surface area and the electrochemical reaction efficiency will be improved, when compared with an electrode in which an electroconductive polymer layer is formed on a metal electrode.

In the electrode of the present invention, it is sufficient that an electroconductive polymer layer is formed substantially on a porous carbon material. If it is in a sheet form, the electroconductive polymer layer may be formed on one surface of the porous carbon material, or may be formed on the entire surface of the porous carbon material. However, in order to obtain the porousness at the surface of the electroconductive polymer layer easily, it is preferable that the aforementioned porous carbon material and the aforementioned electroconductive polymer layer are in direct contact. Also, in the aforementioned electrode, an intermediate layer may be provided between the substrate containing a porous carbon material and the electroconductive polymer layer so as not to inhibit the porousness of the porous carbon material, and the aforementioned electroconductive polymer layer may be formed to have a large surface area by electrolytic polymerization, whereby the electroconductive polymer layer is formed substantially on the porous carbon material serving as the substrate.

The aforementioned substrate contains a porous carbon material; however, the shape is not particularly limited and may be a shape such as plate-shape, sheet-shape, columnar shape, tubular shape, or net-like shape. It is also preferable that the inner wall surface of the cell body of the actuator is covered with a porous carbon material in order to fabricate a compact element. It is not particularly limited as long as the electroconductive polymer layer can be formed substantially on the substrate.

The porous carbon material used as the substrate of the electrode of the present invention is not particularly limited; however, those having a large specific surface area are preferable in order to provoke an efficient electrochemical reaction. In order to construct a compact electrochemical cell, the aforementioned porous carbon material is preferably carbon paper or carbon sheet having a small substrate thickness such as represented by thin activated carbon fiber paper. Also, in the case where there is no need to reduce the aforementioned substrate thickness, a cloth obtained by weaving carbon fiber or carbon felt can be used.

Also, for the aforementioned porous carbon material, those other than described above can be used as well. For example, a porous carbon plate obtained by bonding hollow carbon fibers to each other with carbon, a carbon fiber obtained by carbonization of a carbide of cellulose fiber, a porous carbon material obtained by carbonization through sintering or thermal treatment of a sheet made of plant fiber or a synthetic fiber, and the like can be used as well.

For the aforementioned porous carbon material, a plurality of porous carbon materials may be combined for use. Namely, as the aforementioned porous carbon material, at least one porous carbon material selected from the group consisting of carbon paper, carbon fiber, porous carbon sheet, and activated carbon sheet can be used. The porous carbon material used in the electrode of the present invention is not particularly limited as long as the electroconductive polymer layer can be formed on the carbon material in a state of being in contact.

Also, the substrate of the electrode of the present invention may contain a porous carbon material, and may further contain a metal layer exhibiting electric conductivity such as platinum or gold. When the aforementioned substrate has a multi-layer structure including a metal layer and a porous carbon material, the layer of the porous carbon material may be formed on the metal plate which is the aforementioned metal layer. Also, a metal having electric conductivity such as platinum or gold may be sputtered on a porous carbon material so as to form an electroconductive metal layer on one surface of the porous carbon material layer. When the substrate of the aforementioned electrode has these metal layers, the aforementioned metal layers help to apply a voltage to the whole substrate even if the aforementioned porous carbon material has a low electric conductivity because of having a resistance value. Therefore, an electroconductive polymer can be easily formed by the electrolytic polymerization method.

The aforementioned porous carbon material is not particularly limited as long as it is porous in order to increase the surface area of the electroconductive polymer layer formed on the porous carbon material. However, it is preferable that the specific surface area of the aforementioned porous carbon material is 1 to 2000 $m^2/g$, because then the specific surface area of the aforementioned electroconductive polymer layer will be larger to increase the amount of the dopant going out and coming in.

Also, it is preferable that the aforementioned porous carbon material has a porosity of 5 to 90%, because then it will be easier for the electroconductive polymer layer formed on the porous carbon material to obtain a large surface area. It is preferable that the aforementioned porous carbon material has an aperture diameter of 0.01 to 100 μm, because then it will be easier for the electroconductive polymer layer formed on the porous carbon material to obtain a large surface area even if the thickness of the electroconductive polymer layer is increased.

In obtaining the electrode of the present invention, the porous carbon material or the porous carbon material having a metal layer is used as an electrode during the electrolytic polymerization. For this reason, the aforementioned porous carbon material and/or the aforementioned metal layer can be used as an auxiliary electrode to the electroconductive polymer layer because of having electric conductivity. By applying a voltage to the aforementioned porous carbon material and/or the aforementioned metal layer as an auxiliary electrode, a voltage can be easily applied to the whole of the aforementioned electroconductive polymer layer.

The electroconductive polymer layer in the electrode of the present invention is not particularly limited as long as it is formed substantially on the substrate by electrolytic polymerization. As the electroconductive polymer that forms the aforementioned electroconductive polymer layer, a known electroconductive polymer can be used, and polypyrrole, polythiophene, polyaniline, polyphenylene, or the like can be used; however, it is preferably polypyrrole using pyrrole and/or a pyrrole derivative as a monomer, because the production is easy and it is electrochemically stable.

In particular, it is preferable that, in the aforementioned electrolytic polymerization method, an electrolytic solution used in the aforementioned electrolytic polymerization method (1) contains an organic compound containing at least one bond or functional group among ether bond, ester bond, carbonate bond, hydroxyl group, nitro group, sulfone group, and nitrile group and/or halogenated hydrocarbon as a solvent and (2) contains trifluoromethanesulfonate ion and/or an anion containing a plurality of fluorine atoms relative to a center atom in the electrolytic solution, and that the aforementioned polypyrrole is an electroconductive polymer obtained by an electrolytic polymerization method using the aforementioned porous carbon material as a working electrode. The electroconductive polymer obtained by this electrolytic polymerization method is excellent as a material constituting the electrode as a component because of having a good film quality such as being dense, having a good close adhesion to the substrate, being excellent in mechanical strength, and having a high electrochemical activity. The aforementioned polypyrrole is preferably polypyrrole obtained by the aforementioned electrolytic polymerization method in which the aforementioned solvent is an aromatic ester such as methyl benzoate, and the aforementioned electrolytic solution contains trifluoromethanesulfonate ion or hexafluorophosphate ion. Also, instead of trifluoromethanesulfonate ion and/or an anion containing a plurality of fluorine atoms relative to a center atom, perchlorate ion may be used because of being chemically stable.

As the aforementioned organic compound, 1,2-dimethoxyethane, 1,2-diethoxyethane, tetrahydrofuran, 2-methyltetrahydrofuran, 1,4-dioxane (the above are organic compounds containing an ether bond), γ-butyrolactone, ethyl acetate, n-butyl acetate, t-butyl acetate, 1,2-diacetoxyethane, 3-methyl-2-oxazolidinone, methyl benzoate, ethyl benzoate, butyl benzoate, dimethyl phthalate, diethyl phthalate (the above are organic compounds containing an ester bond), propylene carbonate, ethylene carbonate, dimethyl carbonate, diethyl carbonate, methyl ethyl carbonate (the above are organic compounds containing a carbonate bond), ethylene glycol, butanol, 1-hexanol, cyclohexanol, 1-octanol, 1-decanol, 1-dodecanol, 1-octadecanol (the above are organic compounds containing a hydroxyl group), nitromethane, nitrobenzene (the above are organic compounds containing a nitro group), sulfolane, dimethylsulfone (the above are organic compounds containing a sulfone group), and acetonitrile, butyronitrile, benzonitrile (the above are organic compounds containing a nitrile group) can be raised as examples. Here, the organic compounds containing a hydroxyl group are not particularly limited; however, they are preferably polyhydric alcohols and monohydric alcohols having a carbon number of 4 or more because of having a good expansion and contraction ratio. Here, in addition to those exemplified above, the aforementioned organic compounds may be an organic compound containing two or more bonds or functional groups among ether bond, ester bond, carbonate bond, hydroxyl group, nitro group, sulfone group, and nitrile group in an arbitrary combination within a molecule.

The halogenated hydrocarbon contained as a solvent in an electrolytic solution of the aforementioned electrolytic polymerization method is not particularly limited as long as it is one in which the hydrogen atoms in the hydrocarbon is substituted with at least one halogen atom, and which can exist stably in a liquid form under the electrolytic polymerization condition. As the aforementioned halogenated hydrocarbon, dichloromethane and dichloroethane can be raised as examples. One may use only one kind of the aforementioned halogenated hydrocarbon as a solvent in the aforementioned electrolytic solution; however, one may use two or more kinds in combination as well. Also, the aforementioned halogenated hydrocarbon may be used by being mixed with the organic compounds described above, and a solvent obtained by mixing with the organic solvent may be used as a solvent in the aforementioned electrolytic solution as well.

The content of the aforementioned trifluoromethanesulfonate ion and/or anion containing a plurality of fluorine atoms relative to a center atom in the electrolytic solution is not particularly limited; however, it is preferably contained in an amount of 0.1 to 30 wt %, more preferably 1 to 15 wt %, in the electrolytic solution.

The trifluoromethanesulfonate ion is a compound represented by the chemical formula $CF_3SO_3^-$. Also, the anion containing a plurality of fluorine atoms relative to a center atom has a structure such that a plurality of fluorine atoms are bonded to the center atom such as boron, phosphorus, antimony, or arsenic. The anion containing a plurality of fluorine atoms relative to a center atom is not particularly limited; however, tetrafluoroborate ion ($BF_4^-$), hexafluorophosphate ion ($PF_6^-$), hexafluoroantimonate ion ($SbF_6^-$), and hexafluoroarsenate ion ($AsF_6^-$) can be raised as examples. Among these, $CF_3SO_3^-$, $BF_4^-$, and $PF_6^-$ are preferable in view of the safety to human beings and the like. Regarding the aforementioned anion containing a plurality of fluorine atoms relative to a center atom, one kind of an anion may be used, and also plural kinds of anions may be simultaneously used, and further, trifluoromethanesulfonate ion and plural kinds of anions containing a plurality of fluorine atoms relative to a center atom may be simultaneously used.

The electrolytic solution used in the aforementioned electrolytic polymerization method may contain a monomer of an electroconductive polymer in a solution of the aforementioned organic compound solvent with the aforementioned trifluoromethanesulfonate ion and/or anion containing a plurality of fluorine atoms relative to a center atom, and may further contain other known additives such as polyethylene glycol and polyacrylamide.

Also, the aforementioned polypyrrole may be a polypyrrole obtained by using an electrolytic solution containing perfluoroalkylsulfonylimide ion represented by the following formula (1) in the aforementioned electrolytic polymerization method.

$$(C_nF_{(2n+1)}SO_2)(C_mF_{(2m+1)}SO_2)N^- \qquad \text{formula (1)}$$

(Here, N and M are Arbitrary Integers.)

In this case, in the aforementioned electrolytic solution, it is preferable to use an organic compound containing at least one bond or functional group among ether bond, ester bond, carbonate bond, hydroxyl group, nitro group, sulfone group, and nitrile group and/or halogenated hydrocarbon as a solvent in order to obtain a film having a good film quality and electrochemical properties.

Here, the aforementioned n and m are arbitrary integers of 1 or larger, and n and m may be the same integer or n and m may be different integers. For example, trifluoromethyl group, pentafluoroethyl group, heptafluoropropyl group, nonafluorobutyl group, undecafluoropentyl group, tridecafluorohexyl group, pentadecafluoroheptyl group, heptadecafluorooctyl group, and others can be raised as examples. As a salt containing the aforementioned perfluoroalkylsulfonylimide ion, bistrifluoromethylsulfonylimide salt, bis(pentafluoroethylsulfonyl)imide salt, and bis(heptadecafluorooctylsulfonyl)imide salt can be used, for example.

The content of the aforementioned perfluoroalkylsulfonylimide ion in the electrolytic solution in the electrolytic polymerization method is not particularly limited; however, the electrolytic solution preferably contains 1 to 40 wt %, more preferably 2.8 to 20 wt %, as a perfluoroalkylsulfonylimide salt in order to ensure a sufficient electric ion conductivity of the electrolytic solution.

In addition, the present invention is also an actuator using the electrode described above. Namely, the actuator of the present invention is an actuator including a pair of electrodes and an electrolyte, wherein a working electrode is an extensible and contractible electrode containing an electroconductive polymer, and an opposing electrode is an electrode wherein the above-described electroconductive polymer layer formed by an electrolytic polymerization method is provided substantially on a porous carbon material.

FIG. 1 is a cross-sectional view of an actuator using an electrode wherein an electroconductive polymer layer formed by the electrolytic polymerization method is provided substantially on a porous carbon material. A tubular actuator 1, the actuator 1, is provided with an operation part 3 formed with a cylindrical electroconductive polymer and capable of electrolytic extension/contraction in an inside space of a box body 2 formed with a flexible material. A recessed part 23 is formed in an inner surface of a bottom part 22 of the box body 2. One end of the operation part 3 is fitted into the recessed part 23 via an electroconductive connection plate 4, whereby the working electrode 3 is mounted to the box body 2. A shaft 10 mounted to the tip end of the working electrode 3 penetrates through the tip end part 21 of the box body 2 to extend to the outside of the actuator 1. Also, in the inside space of the box body 2, a columnar opposing electrode 5 is mounted near the inner surface of the side wall of the box body 2 by respectively fitting into the opposing-electrode-fitting recessed part 24 provided in the bottom part 22. In the inside space of the box body 2, a residual inside space excluding the opposing electrode 5 and the working electrode 3 is filled with an electrolyte 6. A power source 9 is connected via a lead 7 to the opposing electrode 5, and is connected via a lead 8 to the electroconductive connection plate 4 that is in contact with the working electrode 3. By supplying electric power from the power source 9, a voltage can be applied to the opposing electrode 5 and the working electrode 3, whereby the working electrode 3 can perform electrolytic extension/contraction. By electrolytic extension/contraction of the working electrode 3, the shaft 10 can perform reciprocating movement to generate a force F.

For the opposing electrode 5, by using an electrode in which an electroconductive polymer layer formed by the above-described electrolytic polymerization method is provided substantially on a porous carbon material, the specific surface area of the opposing electrode will be larger, and the amount of dopants with which the electroconductive polymer contained in the opposing electrode can be doped and dedoped will be larger, so that the size can be reduced as compared with a conventional electrode such as platinum.

Also, the opposing electrode of FIG. 1 is used as a component separate from the box body 2. However, in the actuator of FIG. 1, as a substrate of the opposing electrode, a carbon material may be applied onto the wall surface in the inside of the box body 2 to form a substrate, and an electroconductive polymer layer may be formed on the substrate. An actuator cell provided with an electrode (opposing electrode) in which a substrate is formed by application of a carbon material in the inside of the actuator cell and an electroconductive polymer layer is formed on the substrate is especially preferable because there is no need to use an opposing electrode which is a separate and independent component in the inside of the actuator, thereby facilitating the space saving and simplifying the assemblage.

The aforementioned working electrode is not particularly limited as long as it contains the above-described electroconductive polymer and can electrochemically expand and contract by application of voltage. Particularly, the aforementioned working electrode preferably exhibits an expansion/contraction property with an expansion/contraction ratio of 5% or higher when a voltage is applied. As the electroconductive polymer used in the aforementioned working electrode, an electroconductive polymer having a desired property can be used in accordance with the needs such as in the case where largeness of displacement is needed or in the case where mechanical strength such as tensile strength is needed. This actuator can be used suitably for the usage that requires a large expansion/contraction ratio such as represented by artificial muscle. The aforementioned operation part can suitably contain, in addition to the dopants, an electroconductive material such as a metal wire or electroconductive oxide for reducing the resistance value as an operation electrode.

The aforementioned electrolyte is not particularly limited; however, it is preferably an electrolytic solution or a gel electrolyte so as not to inhibit the electrochemical expansion/contraction of the aforementioned working electrode. The solvent contained in the aforementioned electrolytic solution or the aforementioned gel electrolyte is not particularly limited, so that water or an organic solvent can be used.

The anion contained in the aforementioned electrolyte and used as a dopant is not particularly limited; however, it can contain an anion used as a dopant in the working electrode and the opposing electrode. Therefore, in the actuator of the present invention, the dopants used in the working electrode and the opposing electrode are identical and that the electrolyte contains the dopants used in the working electrode and the opposing electrode. For this reason, it is preferable that the salt dissolved in the electrolytic solution used for electrolytic polymerization in obtaining the working electrode and the salt dissolved in the electrolytic solution used for electrolytic polymerization in obtaining the opposing electrode are identical and that the aforementioned salt is contained also in the electrolytic solution in the aforementioned actuator.

EXAMPLES

Hereafter, Examples of the present invention as well as the Comparative Examples and Preparation Examples will be shown; however, the present invention is not limited to the following.

(Preparation Example of Electroconductive Polymer Film)

Pyrrole and tetrabutylammonium trifluoromethanesulfonate were dissolved in methyl benzoate by a known agitation method and adjusted so that the concentration of pyrrole would be 0.25 mol/l and the concentration of tetrabutylammonium would be 0.2 mol/l, so as to obtain an electrolytic solution containing a monomer and an electrolyte. By using a Ti electrode as a working electrode and using a Pt electrode as an opposite electrode in this electrolytic solution, electrolytic polymerization was carried out by a constant-current method with a polymerization current density of 0.2 mA/cm$^2$ described in Table 1, so as to obtain an electroconductive polymer film having a film thickness of 15 μm on the titanium electrode. This electroconductive polymer film was peeled off from the titanium electrode with forceps while allowing the film to swell with use of acetone, so as to obtain an electroconductive polymer film that will be used as an actuator element.

Example 1

Pyrrole and tetrabutylammonium hexafluorophosphate were dissolved in methyl benzoate serving as a solvent by a known agitation method, so as to prepare an electrolytic solution containing pyrrole as a monomer at a concentration of 0.25 mol/l and containing a dopant salt at a concentration of 0.2 mol/l. By using a carbon paper (trade name: "TGP-H-030", manufactured by Toray Industries, Inc.) which is a porous carbon material as a working electrode and using a platinum electrode as an opposite electrode in this electrolytic solution, electrolytic polymerization was carried out by a constant-current method with a polymerization current density of 0.2 mA/cm$^2$. By the aforementioned electrolytic polymerization, an electrode of Example 1 having an electroconductive polymer layer on a substrate was obtained in which the film thickness of the electroconductive polymer layer was 15 to 30 m.

Example 2

An electrode of Example 2 was obtained in the same manner as in Example 1 except that, as a porous carbon material which is a working electrode at the time of electrolytic polymerization, instead of the carbon paper, a porous carbon material containing a metal layer was used which was obtained by kneading 80 wt % of carbon powder (trade name: "MCMB", having a center particle size of 22.5 μm, manufactured by Osaka Gas Co., Ltd.) with 10 wt % of binder resin (polyvinylidene fluoride) and 10 wt % of NMP (N-methyl-2-pyrrolidone) to prepare a paste and by applying the paste on a platinum plate, followed by drying.

Example 3

An electrode of Example 3 was obtained in the same manner as in Example 1 except that, as a porous carbon material which is a working electrode at the time of electrolytic polymerization, instead of the carbon paper, an activated carbon sheet (trade name: "KP035", manufactured by Toyobo Co., Ltd.) was used.

Comparative Example

As the working electrode at the time of electrolytic polymerization, a commercially available platinum plate was used as the electrode instead of the carbon paper which was a porous carbon material.

(Evaluation)

With use of the electrodes of Examples 1 to 3 and Comparative Example, a test was carried out by the following evaluation method, where evaluation was carried out according to the following evaluation standard with respect to generation of gas on the surface of the opposing electrode and the expansion/contraction performance of the actuator element. The results are shown in Table 1. Here, the evaluation of generation of gas was carried out by observing the opposing electrode surface by eye inspection while a voltage was being applied between the working electrode and the opposing electrode.

(Evaluation Method)

The electrodes of Examples 1 to 3 and Comparative Example were cut into a size having a width of 10 mm and a length of 50 mm, so as to prepare an opposing electrode. The electroconductive polymer film (having a width of 26 mm, a length of 90 mm, and a thickness of 20 μm) obtained by the above-described Preparation Example was used as a working electrode which was an actuator element. The aforementioned opposing electrode and working electrode were connected to a power source via a lead at the terminal of each electrode, and were held in the electrolytic solution for operation. By using a commercially available Ag/Ag$^+$ electrode as a reference electrode, a voltage of 1.5 V was applied for 30 seconds between the actuator element and the opposing electrode. The voltage applied between the actuator element and the opposing electrode during this voltage application was measured with use of a PC recorder (trade name: "R1MS-GH3", manufactured by M-System Co., Ltd.), so as to measure the expansion/contraction ratio of the actuator element. Here, as the electrolytic solution for operation, a 1 mol/l solution of tetrabutylammonium hexafluorophosphate in methyl benzoate was used.

(Evaluation Standard)

For the evaluation of expansion/contraction performance, the following standard was used.

○: in a state in which a sufficient opposing electrode area was present, an expansion/contraction performance similar to the case in which an electric potential of +0.7 V vs Ag/Ag$^+$ was applied to the element (an expansion/contraction ratio of 5% or more in the case of the element of the above-described Preparation Example) was exhibited.

Δ: an expansion/contraction performance of 50% or more relative to the expansion/contraction performance of the case of "○" (expansion/contraction ratio of 2.5% or more and less than 5% in the case of the element of the above-described Preparation Example) was exhibited.

x: an expansion/contraction performance of less than 50% relative to the expansion/contraction performance of the case of "○" (expansion/contraction ratio of less than 2.5% in the case of the element of the above-described Preparation Example) was exhibited.

(Results)

TABLE 1

|  | Example | | | Comparative |
| --- | --- | --- | --- | --- |
|  | 1 | 2 | 3 | Example |
| Electric potential applied to the actuator element (V) | +0.8 | +0.9 | +1.0 | +0.1 |
| Electric potential applied to the opposing electrode (V) | −0.7 | −0.6 | −0.5 | −1.4 |
| Generation of gas | Absent | Absent | Absent | Much |
| Expansion/contraction performance of the actuator element | ○ | ○ | ○ | x |

When the electrode of Example 1 was used as the opposing electrode, the electric potential of the actuator element was 0.8V, and the electric potential applied to the opposing electrode was 0.7V, as shown in Table 1. Therefore, the electric potentials of the actuator element and the opposing electrode were higher as compared with the case in which the electrode of the Comparative Example was used as the opposing electrode. For this reason, the electrolytic expansion/contraction of the actuator element was large, and the ratio of the change in the length of the element (expansion/contraction ratio) before and after the voltage application to the element was 5% or more, thereby showing a good expansion/contraction performance. Also, there was no generation of gas at the opposing electrode. However, in the Comparative Example, gas was generated from the entire surface of the opposing electrode surface, and the amount of the generated gas was also large.

When the electrode of Example 2 was used as the opposing electrode, the electric potential of the actuator element was 0.9V, and the electric potential applied to the opposing electrode was 0.6V, as shown in Table 1. Therefore, the electric potentials of the actuator element and the opposing electrode were higher as compared with the case in which the electrode of the Comparative Example was used as the opposing electrode, thereby showing a good expansion/contraction performance. Also, there was no generation of gas.

When the electrode of Example 3 was used as the opposing electrode, the electric potentials of the actuator element and the opposing electrode were also higher, as compared with the case in which the electrode of the Comparative Example was used as the opposing electrode, as shown in Table 1, thereby showing a good expansion/contraction performance in the same manner as in Examples 1 and 2. Also, there was no generation of gas.

INDUSTRIAL APPLICABILITY

The actuator of the present invention can be used suitably as a driving part that generates a linear driving power or a driving part that generates a driving power for moving on a track type path made of a circular arc part, or a pressing part that performs linear operation or curved line operation in an OA apparatus, an antenna, a device for mounting a human being such as a bed or a chair, a medical apparatus, an engine, an optical apparatus, a fixation tool, a side trimmer, a vehicle, a lifting machine, a food processing device, a cleaning device, a measuring apparatus, a testing apparatus, a controlling apparatus, a fabricating machine, a processing machine, an electronic apparatus, an electron microscope, an electric shaver, an electric motor tooth brush, a manipulator, a mast, a playing device, an amusement apparatus, a simulation device for riding, a pressing device of vehicle staff, and an attached equipment extension apparatus for airplanes. The aforementioned actuator can be used, for example, as a valve used generally in machines including the above-described apparatus such as an OA apparatus and a measuring apparatus, as a driving part that generates a linear driving power or a driving part that generates a driving power for moving on a track type path made of a circular arc part, or a pressing part that performs linear operation in a braking and locking device. Also, generally in machines and apparatus other than the above-described devices, apparatus, and machines, it can be used suitably as a driving part of a positioning device, a driving part of a posture controlling device, a driving part of a lifting apparatus, a driving part of a conveying device, a driving part of a moving device, a driving part of a device for adjustment of quantity, direction, or the like, a driving part of a device for adjustment of a shaft or the like, a driving part of a guiding device, and a pressing part of a pressing device. Also, the aforementioned actuator can be suitably used as a driving part in a joint device in a joint part capable of being directly driven such as a joint middle member or the like, or in a driving part that gives rotation movement to a joint.

The invention claimed is:

1. An actuator comprising:
    an electrolytic solution or gel electrolyte as an electrolyte, and
    a pair of the electrodes, said pair comprises a working electrode and an opposing electrode, each of said electrodes comprising an electroconductive polymer layer, wherein the electroconductive polymer layer is formed by electrolytic polymerization method, and the electroconductive polymer layer consists of a polypyrrole and one or more dopants,
    wherein an expansion/contraction ratio of the working electrode is 5% or more, wherein the opposing electrode further comprises a substrate, which comprises a porous carbon material, and wherein the electroconductive polymer layer is provided directly on the substrate.

2. An actuator according to claim 1
    wherein the electroconductive polymer layer is composed of polypyrrole obtainable by an electrolytic polymerization method of polymerizing pyrrole and/or pyrrole derivatives,
    wherein an electrolytic solution used in the electrolytic polymerization method, which need not be the same as the electrolytic solution used as the electrolyte, comprises:
    (1) an organic compound and/or halogenated hydrocarbon, wherein the organic compound has at least one ether bond, ester bond, or carbonate bond; and/or at least one hydroxyl group, nitro group, sulfone group, or nitrile group; and
    (2) trifluoromethanesulfonate ion and/or an anion, wherein the anion has a plurality of fluorine atoms for a center atom.

3. An actuator according to claim 1
    wherein the electroconductive polymer layer is composed of polypyrrole obtainable by an electrolytic polymerization method of polymerizing pyrrole and/or pyrrole derivatives,
    wherein an electrolytic solution used in the electrolytic polymerization method comprises:
    (1) an organic compound and/or halogenated hydrocarbon, wherein the organic compound has at least one ether bond, ester bond, or carbonate bond; and/or at least one hydroxyl group, nitro group, sulfone group, or nitrile group; and
    (2) a perfluoroalkylsulfonylimide ion represented by the following formula 1, $$(C_nF_{(2n+1)}SO_2)(C_mF_{(2m+1)}SO_2)N^- \quad \text{formula 1}$$

where n and m are integers of 1 or larger.

4. A method for producing an actuator according to claim 1, comprising forming an electrode by a method comprising:
    providing a substrate comprising a porous carbon material, and
    forming an electroconductive polymer layer directly on the substrate, the polymer layer consisting of a polypyrrole and one or more dopants, wherein the electroconductive polymer layer is formed by electrolytic polymerization method.

5. The method according to claim 4, wherein an electrolytic solution used in the electrolytic polymerization method comprises:
    (1) an organic compound and/or halogenated hydrocarbon, wherein the organic compound has at least one ether bond, ester bond, or carbonate bond; and/or at least one hydroxyl group, nitro group, sulfone group, or nitrile group; and
    (2) trifluoromethanesulfonate ion and/or an anion, wherein the anion has a plurality of fluorine atoms for a center atom.

6. The method according to claim 4, wherein
    the electroconductive polymer layer is composed of polypyrrole obtainable by an electrolytic polymerization method of polymerizing pyrrole and/or pyrrole derivatives,
    wherein an electrolytic solution used in the electrolytic polymerization method comprises:
    (1) an organic compound and/or halogenated hydrocarbon, wherein the organic compound has at least one ether bond, ester bond, or carbonate bond; and/or at least one hydroxyl group, nitro group, sulfone group, or nitrile group; and
    (2) a perfluoroalkylsulfonylimide ion represented by the following formula 1, $$(C_nF_{(2n+1)}SO_2)(C_mF_{(2m+1)}SO_2)N^- \quad \text{formula 1}$$

where n and m are integers of 1 or larger.

7. The method according to claim 6, wherein the electrolytic solution contains the perfluoroalkylsulfonylimide ion in a salt form by 1 to 40 wt %.

8. The actuator according to claim 1, further comprising a shaft mounted on the tip end of the working electrode.

9. The actuator according to claim 1, wherein the dopants used in the working electrode and the opposing electrode are identical and the electrolyte contains the same dopants as the working electrode and the opposing electrode.

* * * * *